(No Model.)

A. DU BOIS.
GUARD GATE FOR CARS.

No. 269,839. Patented Jan. 2, 1883.

WITNESSES:
Elmer B. Silver
Thomas Van Antwerp

INVENTOR
Addison DuBois
BY
ATTORNEY

UNITED STATES PATENT OFFICE.

ADDISON DU BOIS, OF NEW YORK, N. Y.

GUARD-GATE FOR CARS.

SPECIFICATION forming part of Letters Patent No. 269,839, dated January 2, 1883.

Application filed July 10, 1882. (No model.)

*To all whom it may concern:*

Be it known that I, ADDISON DU BOIS, of the city and State of New York, have invented certain new and useful Improvements in Guard-Gates for Railway-Cars; and I do hereby declare that the following is a full, clear, and exact description thereof, reference being had to the accompanying drawings, forming part of this specification, in which—

Figure 1:
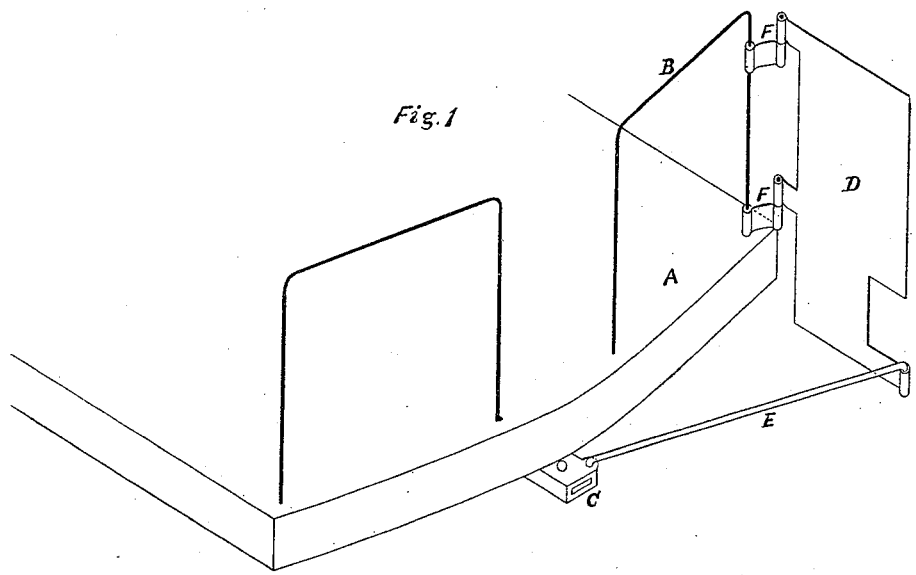
Figure 2:
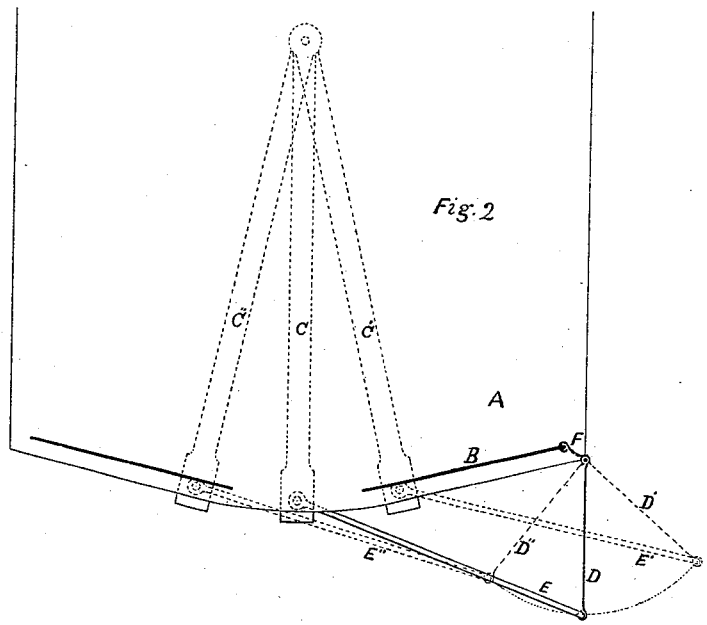

Figure 1 is a perspective view of the platform, guard-rail, and draw-bar of a railway-car, with the attached guard-gate and the connecting-rod for operating said gate, the bar being in position at the center of the platform, the gate in line with the side of the car, and the rod attached to the bar by means of its hook-shaped end engaging a perforation in a lug on said bar. Fig. 2 is a plan view of same, the different positions of the gate and connecting-rod other than shown in Fig. 1 being indicated by dotted lines. The connecting-rod is shown in this figure as attached or secured to the draw-bar by means of the coupling-pin, and the draw-bar exhibited in three different positions, coinciding with the different positions shown of the gate and connecting-rod.

Similar letters indicate corresponding parts in the drawings.

My invention relates to that class of guard-gates for railway-cars which serve to close the openings between the platform guard-rails of two coupled cars; and it consists in so securing said gates to the car by pivots or hinges, and so connecting said gate with the oscillating draw-bar or with the truck of said car by a connecting-rod as to operate and control the operation of said gate.

In all trains of cars there is a considerable opening between the outer ends of the platforms of the abutting cars, more especially in those adapted to turn short curves. Accidents have occurred at railroad-stations through carelessness or through the crowding and pushing of the passengers, the unfortunate being injured by falling between the cars.

My invention is intended to prevent this; and in order to secure that end, I secure at one of the outer ends of each platform A of the car, (and at the diagonally-opposite corners of said car,) by pivots or hinges F, the swinging guard-gate D, which is of such proportions and so secured to the guard-rail B by the hinges F that when the two abutting coupled cars are in line, and the gate in position in line or parallel with the side of its car, said gate will effectually close the opening between the platform guard-rails of the two cars. To secure the gate in the position described, and also to provide for its automatic adjustment to the end that contact with the platform of the abutting cars, when said cars are turning a curve or following the sinuosities of the track, may be prevented. I connect said gate with the draw-bar C (or to the truck, as hereinafter set forth) by means of the connecting-rod E. The draw-bar, being pivoted at the king-bolt of the truck, is permitted to oscillate and adapt itself to the oscillations of the draw-bar of the car to which it is coupled. As shown in Fig. 2, such oscillations, by means of the connecting-rod E, project or withdraw the outer edge of the gate beyond or within its normal line—*i. e.*, its position in line with the side of the car. When on the inside of the curve the gate is swung outwardly, as at D', Fig. 2, clear of contact with the platform of the car next to it, and when on the outside of the curve the gate is swung inwardly within the line of the side of the car, as shown at D'', Fig. 2.

While I prefer the construction above described, I do not wish to be understood as confining myself to that particular construction, as the inner end of the connecting-rod E may be attached to the truck of the car by any well-known means instead of to the draw-bar. I prefer to form each end of the rod E into a hook, as shown in the drawings, providing suitable devices on gate and draw-bar or truck to receive said hook-shaped ends, to the end that said rod may be readily disengaged from the gate or from the bar or truck, in order to allow of convenient access between the platforms of the cars. It is evident that if one end of the rod is secured to the truck itself, and the same degree of oscillation of the gate is required, as shown in the drawings, the rod must be of greater length and attached to the gate nearer its pivotal point.

Any convenient device well-known to mechanics may be secured to the truck which will actuate the rod E in conformity with the oscillations of the truck, and thereby operate the gate, my purpose being to automatically operate the gate by means of a connecting-rod, said rod being vibrated by the oscillations of the draw-bar or the oscillations of the truck, to whichever it may be found most convenient to secure said rod.

Having thus described my invention, what I claim, and desire to secure by Letters Patent, is—

1. A railway-car guard-gate pivoted at a point at or near the outer corner of the platform of a car, extending outwardly from said platform, and so connected with the draw-bar of said car that it will respond to the oscillations of said draw-bar, and secured in position by said draw-bar and its connections, substantially as set forth.

2. The pivoted gate D, the connecting-rod E, and the oscillating draw-bar C, all combined as set forth.

3. A railway-car guard-gate pivoted at or near the outer corner of the platform of a car, extending outwardly from said car, and connected with the truck of said car by a rod, whereby said gate is positively operated by and caused to respond to the horizontal oscillations of said truck, and is secured in position by said truck, substantially as and for the purpose set forth.

ADDISON DU BOIS.

Witnesses:
ELMER B. SILVER,
THOMAS VAN ANTWERP.